March 13, 1973  G. M. FEDERSPILL  3,719,985
METHOD OF MAKING BUSHINGS
Filed Aug. 13, 1971
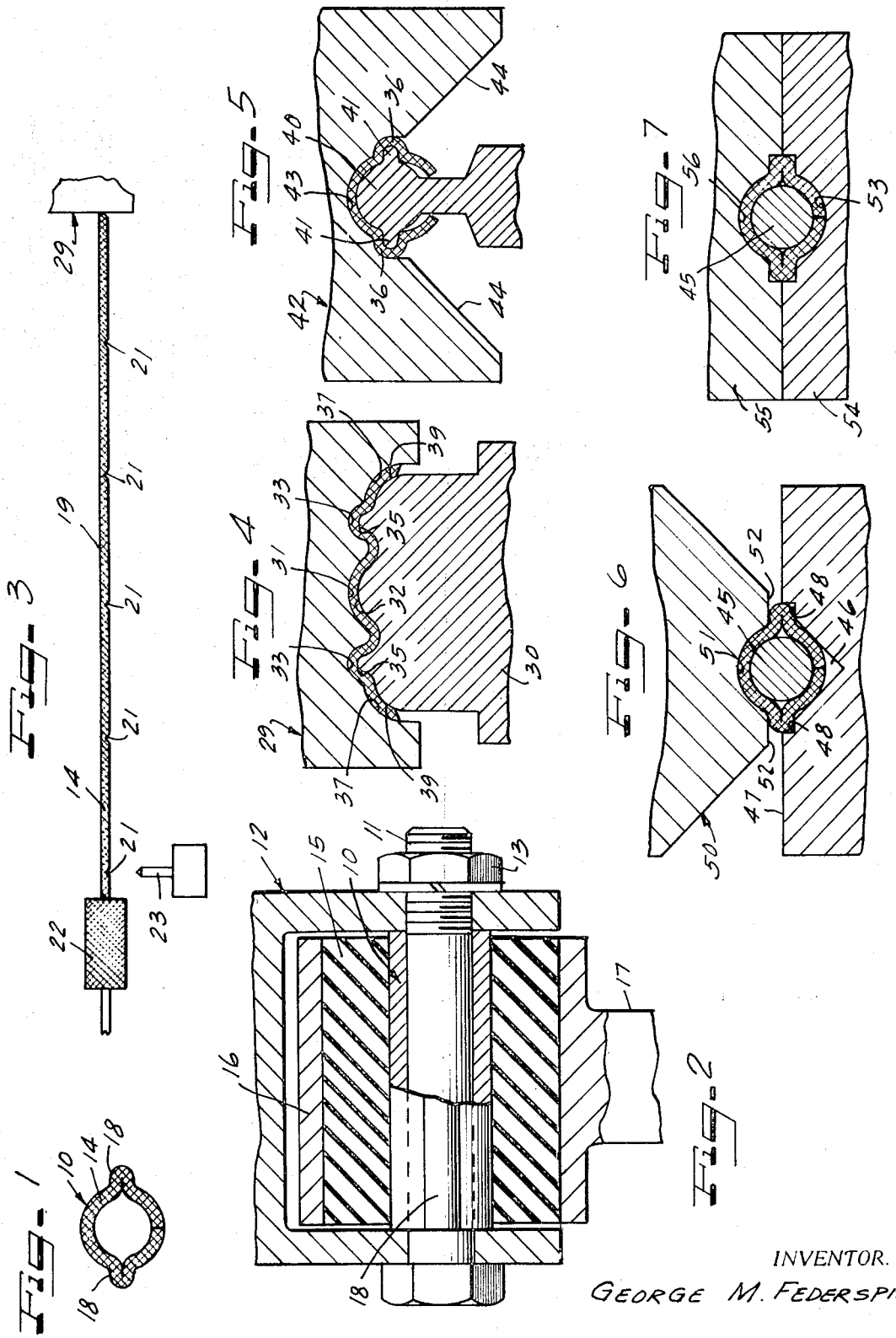
INVENTOR.
GEORGE M. FEDERSPILL
BY ATTORNEYS United States Patent Office 3,719,985
Patented Mar. 13, 1973

3,719,985
METHOD OF MAKING BUSHINGS
George M. Federspill, Kokomo, Ind., assignor to Steel Parts Corporation, Tipton, Ind.
Filed Aug. 13, 1971, Ser. No. 171,496
Int. Cl. B23p 17/00
U.S. Cl. 29—423
5 Claims

ABSTRACT OF THE DISCLOSURE

Method of making bushings from a flat rolled strip in which the edges of the strip are roughened as by knurling, notching, serrating or slitting to bushing length and the underside of the strip is then successively coined with equally spaced parallel transversely extending V-shaped grooves at intervals corresponding to the length of the completed blanks. The strip is then severed to length along the coined grooves and formed over a die to an undulating form, having a central section formed about the internal diameter of the finished bushing, and end sections spaced on opposite sides of the central section and formed about radii of the same length as the internal radius of the finished bushing. Intermediate sections are formed between the central and end sections about equal radii and upstanding relative to the end and central sections. A second die partially closes the undulating strip about a mandrel. A third set of cooperating dies closes the bushing about a second mandrel and partially depresses the intermediate sections to the form of diametrically opposed lobes. The fourth set of dies is in the form of coining dies and completely closes the bushing to size about a mandrel and completes the form of the diametrically opposed lobes.

BACKGROUND, SUMMARY AND OBJECTS OF INVENTION

This invention is particularly concerned with the making of a bushing for use in flexible joints, such as commonly used in automotive steering and suspension systems. These joints usually consist of a yoke-type housing having a supporting bolt extending through laterally spaced walls of the housing. A bushing is carried by the bolt and held from rotation by engagement with the walls of the housing. Engagement of the walls of the housing with the bushing is usually attained by tightening of a nut on the bolt extending through the bushing and walls of the housing. In such structures, a cylindrical elastic body made of a resilient material, such as rubber, or one of the well-known substitutes for rubber is bonded to the exterior of the bushing between the walls of the housing and is also bonded to the interior of a concentric cylindrical member, which may carry an arm integral therewith or affixed thereto. This arm extends to another member of the steering or suspension system and forms a part of the system. Relative movement of the arm about the bushing and the parts connected to the arm is solely by flexing of the cylindrical elastic body.

A method of making such a bushing is shown and described in my Pat. No. 3,537,292, dated Nov. 3, 1970. Most such bushings are of a relatively large outside diameter to afford ample surface for bonding the elastic member thereto and the inner diameter of the bushing is relatively small to permit bearing contact with the bolt, which for the purposes of economy, standardization and minimum weight, has had an external diameter much less than the internal diameter of the bushing, to which the elastic body is bonded. In the past, these requirements have been partially met by using either a thick-walled bushing or by providing a liner for the bushing, the inner diameter of which affords bearing contact with the bolt.

In order to decrease the cost of such bushings and render it unnecessary to provide a liner for the bushing, the bushing has been made from a rolled strip, portions of which are punched partially through to provide a plurality of embossments the inner ends of which are of the same diameter as the diameter of the shaft or bolt, when the strip is formed in the form of a bushing, and having bearing engagement with the bolt at a plurality of spaced points, and at the same sime providing the required large exterior surface to provide adequate peripheral surface for the bonding of the bushing thereto.

Such bushings have further been formed from round sleeves, with diametrically opposed portions pressed down to extend outwardly of the sleeve and provide projecting portions to increase the external area of the bushing and provide adequate surface area for the bonding of the elastic member thereto. Such bushings are expensive to manufacture and it is difficult to form the internal diameter of the bushing to the close tolerances required to have bearing contact with the bolt.

The present invention is an improvement upon the bushings and methods of making bushings just described, in that the bushing is formed from strip material and the exterior surface of the bushing is provided with diametrically opposed integrally formed lobes projecting from the periphery of the bushing to provide the bearing area for bonding the elastic member thereto, and still providing the bushing with an inner diameter small enough to have bearing contact with the bolt.

An advantage of the bushing of the present invention is that it may be inexpensively formed from a rolled strip of metal by a series of coining, cut-off and forming operations, progressively forming the bushing to its completed form and providing a rolled bushing having an accurate internal diameter fitting along the bolt mounting the bushing to its housing and retaining the bushing from turning movement relative to the housing.

A principal object of the invention, therefore, is to provide a simple and improved method of producing a bushing by severing a strip of rolled metal to length in the form of a blank and forming the blank into the form of a bushing in a series of forming steps, first along a die into a preliminary form and then along a series of mandrels partially wrapping the bushing along a first mandrel, closing the bushing along a second mandrel and depressing the lobes of the bushing, and then finally closing and depressing the bushing and forming the bushing to an accurate size.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is an end view of a bushing constructed in accordance with the principles of the present invention.

FIG. 2 is a fragmentary sectional view, with parts shown in elevation, illustrating one manner in which the improved bushing constructed in accordance with the principles of this invention may be used.

FIG. 3 is a diagrammatic view diagrammatically illustrating certain steps in the formation of the blanks for a bushing in accordance with the principles of the present invention.

FIG. 4 is a diagrammatic end view showing initial cooperating dies cutting the blank to length and forming the blank into an initial undulating form.

FIG. 5 is a view illustrating a second die and mandrel, partially forming the bushing about the mandrel.

FIG. 6 is a view illustrating a third form of cooperating die and mandrel, closing the bushing about the mandrel; and FIG. 7 is a diagrammatic view illustrating a fourth series of dies coining the bushing to size about a mandrel and fully closing the lobes, to project outwardly from opposite sides of the bushing.

DESCRIPTION OF PREFERRED EMBODIMENT OF INVENTION

In FIGS. 1 and 2 of the drawings, I have shown a bushing 10 constructed in accordance with the principles of the present invention and having a cylindrical inner periphery adapted to fit along a bolt 11, extending through the furcations of a bifurcated housing designated by reference numeral 12. Tightening of a nut 13 on an end of the bolt presses the inner sides of the furcations of the housing into engagement with knurled ends 14 of the bushing, to retain the bushing from rotation in the housing. The housing 12 consists of a support which may be fastened to a vehicle frame with the depending walls or furcations of the housing pressed against the knurled ends of the bushing under pressure.

Bonded or otherwise permanently secured to the outer surface of the bushing 10 is a cylindrical elastic member 15 made from an elastic material such as rubber, an elastomer or from any other of the well-known substitutes for rubber. The elastic member 15 is surrounded by a sleeve 16, which is also bonded thereto. The sleeve 16 is shown as having an arm 17 depending therefrom, which may be connected with another part of the automotive steering or suspension system. The arm 17 thus moves about the axis of the bushing 10 by the resiliency of the cylindrical elastic member 15, as the bushing is held from rotation by the bolt 11 engaging the furcations of the housing, with opposite knurled ends thereof.

The bushing 10 having an inner diameter corresponding to the external diameter of the bolt 11 has close fitting engagement with said bolt and the bearing contact area of the bushing for the elastic bushing 15 is attained by the provision of diametrically opposed radially outwardly extending ears or lobes 18 completely encased in the elastic member. In order to increase the contact area for bonding of the elastic bushing to the bushing 10, said bushing may also have punched openings leading therethrough (not shown) which may be spaced 90° from the lobes 18 or otherwise spaced about the bushing to further receive the elastic material of the elastic bushing. The punched holes are not herein shown or described, since they are only provided in special instances and, of themselves, are no part of the present invention.

In FIG. 3 of the drawings, I have diagrammatically shown a strip of metal 19, which may be a rolled strip of metal, transversely coined at uniformly spaced intervals along its bottom, to provide downwardly facing V-shaped coined grooves 21 coined by a coining die 23. I have also shown an exemplary means for roughening the edges of the strip which may be in the form of a knurling roller 22 knurling a longitudinal edge of the strip, prior to coining thereof. A knurling roller 22 may be provided along each side of the strip, for knurling opposite edges of the strip as advanced to the coining die. The knurling rollers may be of any conventional form and are no part of the present invention so need not herein be shown or described in detail. The edges of the strip need not necessarily be knurled, and in place of the knurling station, a serrating station or notching station may be utilized. In many instances, the slitting of oversize strips to bushing length sufficiently roughens the edges of the formed bushing to prevent turning thereof when tightened in its housing.

The coining operation may be effected after the knurling operation by upward movement of the coining die 23, coining downwardly facing V-shaped grooves 21 in the strip, at intervals therealong, in accordance with the required length of the finished blank to form the bushing to its final diameter, as shown and described in my prior Pat. No. 3,537,292. It is, of course, understood that the strip is backed during coining thereof.

At the termination of each coining operation, where it is desired to provide openings through the strip, punching operations may be performed along the centers of the coined grooves 21 and midway between the coined grooves, to increase the effective area of the strip to be bonded to the elastic bushing as previously mentioned.

The strip is advanced toward a cut-off and forming die 29 by suitable advancing means which, for example, may be cooperating pinch rolls (not shown), driven with predetermined dwells, to accommodate the carrying out of the roughening operation first as by knurling, serrating or notching, and then the carrying out of the coining operations in succession as the strip is advanced to a cut-off at the first forming station, formed by a cut-off and forming die 29.

The cut-off and forming die 29 is shown as having cooperation with the stationary anvil or forming die 30 and has an advance face effective to cut off the strip advanced along said anvil along the center line of an advance downwardly opening coined groove 21 into the form of a blank as it is formed into an undulating form. The cutting off of the blank may be in cooperation with a flat anvil or support for the blank (not shown) and the initial cutting off of the strip in the form of a blank and the formation of the blank to an undulated form may be simultaneous operations.

The anvil 30 and die 29 operate on the principles of conventional dies and each have facing and generally mating cooperating arcuate recessed and projecting die surfaces 31 and 32 respectively, formed to form the central portion of the blank into an arcuate form, the arc of which is struck from a radius substantially equal to the internal radius of the completed bushing. The die 29 has recessed portions 33 on opposite sides of the central portion 31 thereof, cooperating with upwardly extending rounded portions 35 projecting upwardly of the anvil 30, to form upstanding relatively small diameter open lobes on the blank, on opposite sides of the central section 31 thereof, and of a uniform symmetrical curvature. Opposite ends 37 and 39 of the die and anvil respectively then drop off along uniform arcs struck from radii substantially equal to the radius of the completed blank.

At the termination of the cut-off and first forming step, the undulating blank is placed in a mandrel 40 generally conforming to the internal diameter of the finished bushing and having lobes 41 extending laterally therefrom in diametrically opposed relation with respect to each other and formed to the general curvature of the internal surfaces of the open lobes. A second die 42 has a recessed die surface 43 conforming generally to the form of external diameter of the upper halves of the bushing and lobes of the blank, as formed about the mandrel 40. Said second die has diverging walls 44, diverging from the die surface 43, and engaging opposite ends of the undulating blank. The die 42 when brought down on the blank on the mandrel 40, partially wraps the blank about the mandrel, and partially closes the open end of the blank, as shown in FIG. 5.

At the termination of the second forming operation, the partially formed blank is removed from the mandrel 40 and placed along a mandrel 45 of a diameter substantially equal to the inside diameter of the finished bushing. The blank partially wrapped about the mandrel 45 may then be placed in a V-shaped upwardly opening recessed portion 46 of an anvil 47.

The V-shaped recessed portion 46 terminates at its upper end into laterally extending shoulders 48 engaging the open lobes of the blank. A die 50, shown as being an open die has an arcuate recessed portion 51 formed on a radius substantially equal to the radius of the external wall of the bushing and has shoulders 52 extending horizontally outwardly from opposite sides of the recess portion 51. The die 50 is then brought down on a partially formed blank in the recessed portion 46 of the anvil 47, to close the blank about the mandrel 45 and close the lobes to the general form of the lobes 18 of the bushing.

At the termination of the third forming step, the partially formed blank on the mandrel 45 is then placed in a recessed die face 53 of an anvil 54, with the mandrel 45 therein. Said recessed die face 53 is formed to conform to the lower half of the finished bushing. A die 55 having a downwardly opening die face 56, conforming exactly to the die face 53 of the anvil 54 cooperating with the anvil 54 forms a coining die. The coining die 55 is then brought downwardly into engagement with the bushing in the die face 53, to finish closing the bushing and the laterally projecting lobes to form the diametrically opposed lobes 18 and coin the bushing to size.

The dies 29, 42, 50 and 55 may be carried in conventional die heads movable toward and from the respective mandrels in a manner well-known to those skilled in the art and from no part of the present invention so are not herein shown or described further.

The bushing is thus formed from a strip of rolled metal in a simple manner, by a series of sequential edge roughening transverse coining, cutoff and forming steps, in which the blank is formed to its cylindrical form by first forming the blank to an undulating form into the general form of an open bushing, and wrapping the undulating bushing partially about a mandrel, having lobes cooperating in the formation of the ears or lobes of the completed bushing. The blank is then closed in a third forming step in cooperation with a die, mandrel and anvil and the diametrically opposed lobes are closed to form the lobes 18, and the bushing is coined to size in a fourth forming step.

The succession of forming steps, and the order of forming and coining the bushing to size by the cooperation of the four dies and anvils shown, provides a simple and accurate means for forming the bushing and closing the blank to the required size, and makes it possible to form the bushing from flat strip material in a simpler and more expeditious manner than former forming operations and particularly such prior operations in which the bushings are formed from metal tubes.

I claim as my invention:

1. The method of making a bushing from a rolled metal strip, comprising the steps of:
   cutting a strip to blank length and forming the blank into an undulating form in a first step,
   placing the blank of undulating form on a mandrel, with the transverse center of the blank in alignment with the center of the mandrel, and the blank extending equal directions along opposite sides of the mandrel, in a second forming step and during this step partially forming the blank to the mandrel and forming intermediate portions of the undulating blank into diametrically opposed open lobes,
   placing a second cylindrical mandrel in the blank and closing the blank and lobes about the cylindrical mandrel in a third forming step,
   then coining the blank to bushing size about a mandrel in a fourth forming step to form the completed bushing.

2. The method of making a bushing in accordance with claim 1, including the steps of intermittently advancing the strip to the first forming step and successively coining one side of the metal strip with V-shaped grooves extending transversely thereof at dwells during advance of the strip and at intervals spaced in accordance with the required lengths of the completed blanks.

3. The method of making a bushing in accordance with claim 2, including the step of roughening opposite edges of the strip prior to the last mentioned coining step.

4. In a method of making bushings from rolled metal strip, and in combination with an anvil and cooperating cut-off and forming die formed with recessed projecting die surfaces symmetrical about the transverse center of the die and an additional series of anvils and cooperating dies and mandrels of substantially the diameter of the finished bushing, including a pair of matching coining dies, the improvement comprising the steps of
   successively coining one side of the metal strip with V-shaped grooves at intervals in accordance with the required lengths of the completed blanks,
   advancing the strip along a first anvil with dwells in advancing movement thereof and then during a dwell in advance of the strip simultaneously cutting the strip to blank length along the center of a V-shaped groove, and forming the strip to an undulating form symmetrical about the transverse center of the blank by cooperative movement of the first die toward the anvil,
   then placing the blank of undulating form on a mandrel with the transverse center of the blank in alignment with a vertical line extending through the center of the mandrel and with the blank extending equal directions along opposite sides of the mandrel,
   partially wrapping the blank about the mandrel by movement of a cooperating die toward the mandrel and forming intermediate portions of the blank into diametrically opposed lobes,
   placing a second cylindrical mandrel in the blank and closing the blank and lobes about the cylindrical mandrel by cooperative movement of a third die towards an anvil in a third forming step,
   then coining the blank to bushing size about a mandrel by cooperative movement of a coining die toward a matching anvil, and then releasing the formed bushing and removing the mandrel therefrom.

5. The method of claim 4, including the steps of providing a coining die and intermittently advancing the strip to overlie the first anvil and during each dwell in advance of the strip effecting the coining of one side of the strip with the coining die, during each interval of dwell in advance of the strip, and
   then providing roughening tools roughening opposite ends of the strip during advance thereof.

References Cited

UNITED STATES PATENTS

| | | | |
|---|---|---|---|
| 400,025 | 3/1889 | Wilmot | 72—368 X |
| 1,387,199 | 8/1921 | Small | 72—368 X |
| 2,096,557 | 10/1937 | Peo | 287—85 R |
| 2,126,473 | 8/1938 | Keller | 29—414 |
| 2,643,446 | 6/1953 | Matthysse et al. | 29—417 X |
| 3,029,155 | 4/1962 | Maier et al. | 29—423 X |
| 3,096,106 | 7/1963 | Wanner | 287—85R X |
| 3,365,775 | 1/1968 | Cavagnero et al. | 29—417 X |
| 3,537,292 | 11/1970 | Federspill | 72—368 |

CHARLES W. LANHAM, Primary Examiner

V. A. DIPALMA, Assistant Examiner

U.S. Cl. X.R.

29—149.5 NM, 414, 417; 72—368, 370